(12) United States Patent
Dor et al.

(10) Patent No.: US 10,180,788 B2
(45) Date of Patent: Jan. 15, 2019

(54) DATA STORAGE DEVICE HAVING INTERNAL TAGGING CAPABILITIES

(71) Applicant: SanDisk Technologies LLC, Plano, TX (US)

(72) Inventors: Orit Dor, Matan (IL); Judah Gamliel Hahn, Ofra (IL)

(73) Assignee: SANDISK TECHNOLOGIES INC., Plano, TX (US)

( * ) Notice: Subject to any disclaimer, the term of this patent is extended or adjusted under 35 U.S.C. 154(b) by 23 days.

(21) Appl. No.: 15/092,296

(22) Filed: Apr. 6, 2016

(65) Prior Publication Data

US 2017/0293431 A1     Oct. 12, 2017

(51) Int. Cl.
*G06F 12/00*     (2006.01)
*G06F 3/06*     (2006.01)
*G06F 17/30*     (2006.01)

(52) U.S. Cl.
CPC .......... *G06F 3/0605* (2013.01); *G06F 3/0643* (2013.01); *G06F 3/0644* (2013.01); *G06F 3/0679* (2013.01); *G06F 17/3012* (2013.01); *G06F 17/3028* (2013.01); *G06F 17/30268* (2013.01); *G06F 12/00* (2013.01); *G06F 2212/2146* (2013.01); *G06F 2212/7207* (2013.01); *H04N 2201/0087* (2013.01); *H04N 2201/3226* (2013.01)

(58) Field of Classification Search
CPC ....................................................... G06F 12/00
USPC ......................................................... 711/103
See application file for complete search history.

(56) References Cited

U.S. PATENT DOCUMENTS

| | | | |
|---|---|---|---|
| 2004/0224700 A1 | 11/2004 | Sawano | |
| 2007/0282908 A1* | 12/2007 | Van der Meulen | ......................... G06F 17/30997 |
| 2008/0228761 A1* | 9/2008 | Kei Leung | ........ G06F 17/30867 |
| 2008/0235486 A1* | 9/2008 | Sepulveda | .......... G06F 11/1441 711/206 |
| 2008/0313558 A1* | 12/2008 | Karaoguz | ........... G06F 17/3002 715/771 |
| 2009/0195807 A1 | 8/2009 | Soneoka et al. | |
| 2012/0019687 A1* | 1/2012 | Razavi | ............... H04N 5/23241 348/231.6 |
| 2014/0201142 A1 | 7/2014 | Varadharajan et al. | |
| 2014/0258222 A1 | 9/2014 | Guo et al. | |
| 2014/0279920 A1 | 9/2014 | Madhavarapu et al. | |

(Continued)

FOREIGN PATENT DOCUMENTS

WO     03079606 A1     9/2003

OTHER PUBLICATIONS

International Search Report and Written Opinion dated May 15, 2017, in International Application No. PCT/US2017/019824, 13 pages.

*Primary Examiner* — Gautam Sain
(74) *Attorney, Agent, or Firm* — Patterson & Sheridan, LLP; Steven Versteeg

(57) ABSTRACT

A data storage device includes a memory and a controller. The memory includes a first partition and a second partition. The controller includes a pattern detector that is configured to detect one or more tags in data from an access device to be stored in the first partition. The controller is configured to generate, in the second partition, one or more links to the data that is stored in the first partition, the one or more links organized according to metadata associated with the one or more tags.

19 Claims, 7 Drawing Sheets

(56) References Cited

U.S. PATENT DOCUMENTS

| | | | |
|---|---|---|---|
| 2014/0293069 A1* | 10/2014 | Lazar | G06F 17/30256 348/207.1 |
| 2014/0306999 A1* | 10/2014 | Yim | G06T 11/60 345/635 |
| 2015/0213065 A1 | 7/2015 | Sisk et al. | |
| 2016/0034198 A1 | 2/2016 | Jogand-Coulomb et al. | |
| 2016/0054934 A1 | 2/2016 | Hahn et al. | |

* cited by examiner

DATA STORAGE DEVICE HAVING INTERNAL TAGGING CAPABILITIES

FIELD OF THE DISCLOSURE

The present disclosure is generally related to organization of data files.

BACKGROUND

Non-volatile data storage devices, such as universal serial bus (USB) flash memory devices or removable storage cards, have allowed for increased portability of data and software applications. Flash memory devices can enhance data storage density by storing multiple bits in each flash memory cell.

A user may store media files, such as audio, video, or image content, in such non-volatile data storage devices. As storage capacity increases, an increasing amount of content may be stored in a single data storage device. However, organizing the files storing the content can be time-consuming for a user of the device. The user may send the files to an online service or host-based service that may organize, categorize, or sort the files. However, sending the files to the online service or the host-based service may expose potentially sensitive data.

DETAILED DESCRIPTION

Particular aspects of the disclosure are described below with reference to the drawings. In the description, common features are designated by common reference numbers. As used herein, "exemplary" may indicate an example, an implementation, and/or an aspect, and should not be construed as limiting or as indicating a preference or a preferred implementation.

Figure 1:
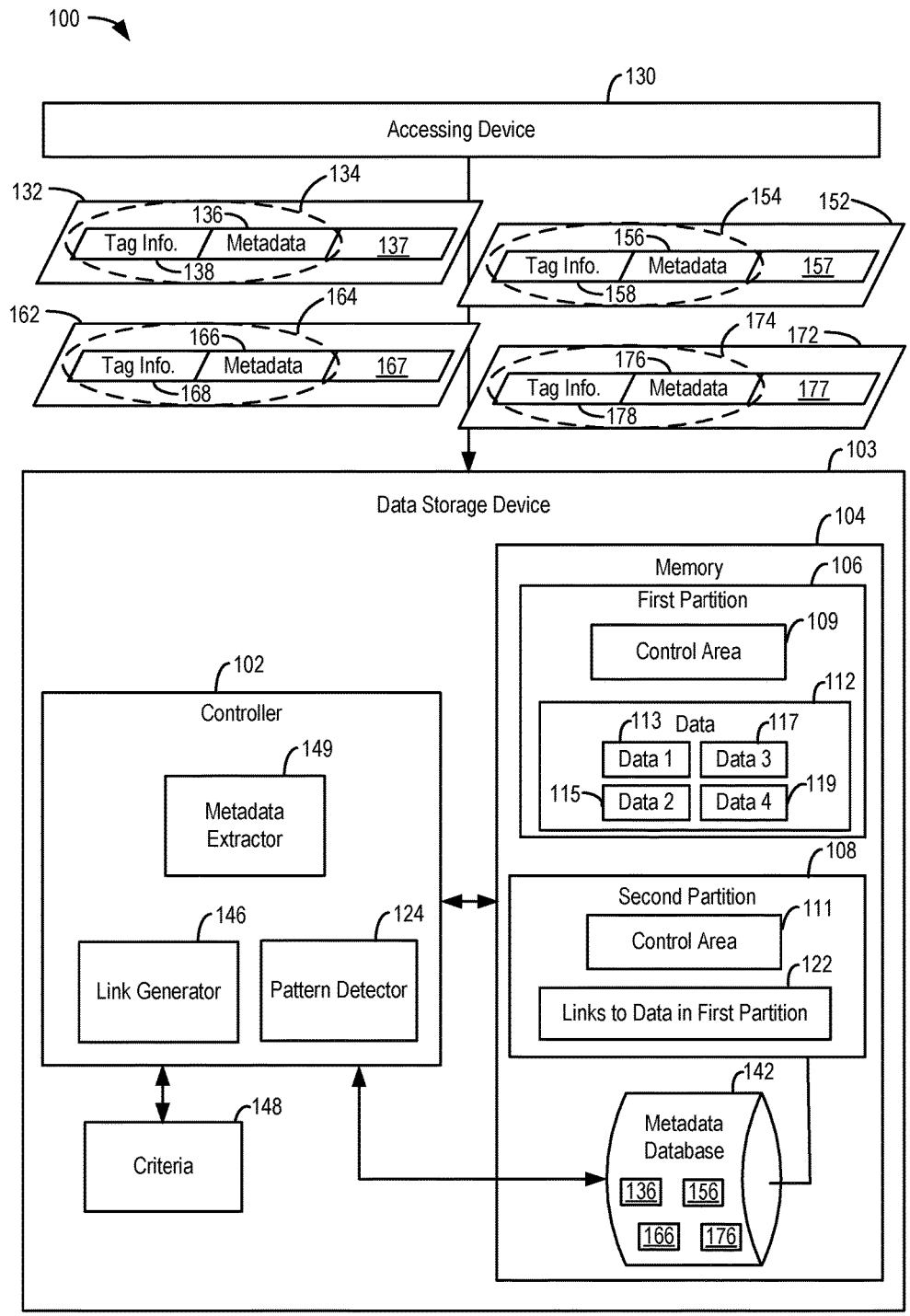
FIG. 1 is a diagram of a particular illustrative example of a system that includes a data storage device coupled to a device.

Referring to FIG. 1, a particular embodiment of a system 100 includes a data storage device 103 coupled to an access device 130. The access device 130 may be configured to provide data, such as data 132, data 152, data 162, and data 172, to be stored (e.g., as data 112) at a memory 104 of the data storage device 103 or to request data to be read from the memory 104. The data storage device 103 is configured to generate and organize one or more links (in a second partition 108 of the memory 104) to particular data in a first partition 106 of the memory 104. The one or more links may be automatically generated and organized (e.g., grouped into virtual directories) based on extracted metadata. Automatically generating and updating the links may enable a user to forego manually grouping the data into directories or libraries. Additionally, because the data is organized locally in the data storage device 103, the user may organize the data without sending the data to an online service or a host-based service, thereby avoiding potentially exposing sensitive data.

The access device 130 may include a mobile telephone, a music player, a video player, a gaming console, an electronic book reader, a personal digital assistant (PDA), a computer, such as a laptop computer or notebook computer, any other electronic device, or any combination thereof. The access device 130 communicates via a memory interface that enables reading from the memory 104 and writing to the memory 104. For example, the access device 130 may operate in compliance with a Joint Electron Devices Engineering Council (JEDEC) industry specification, such as a Universal Flash Storage (UFS) Host Controller Interface specification. As other examples, the access device 130 may operate in compliance with one or more other specifications, such as a Secure Digital (SD) Host Controller specification as an illustrative example. The access device 130 may communicate with the memory 104 in accordance with any other suitable communication protocol.

The data storage device 103 includes a controller 102 coupled to the memory 104. The memory 104 may be a non-volatile memory, such as a NAND flash memory. For example, the data storage device 103 may be a memory card, such as a Secure Digital SD® card, a microSD® card, a miniSD™ card (trademarks of SD-3C LLC, Wilmington, Del.), a MultiMediaCard™ (MMC™) card (trademark of JEDEC Solid State Technology Association, Arlington, Va.), or a CompactFlash® (CF) card (trademark of SanDisk Corporation, Milpitas, Calif.). As another example, the data storage device 103 may be configured to be coupled to the access device 130 as embedded memory, such as eMMC® (trademark of JEDEC Solid State Technology Association, Arlington, Va.) and eSD, as illustrative examples. To illustrate, the data storage device 103 may correspond to an eMMC (embedded MultiMedia Card) device. The data storage device 103 may operate in compliance with a JEDEC industry specification. For example, the data storage device 103 may operate in compliance with a JEDEC eMMC specification, a JEDEC Universal Flash Storage (UFS) specification, one or more other specifications, or a combination thereof.

The controller 102 is configured to receive data and instructions from and to send data to the access device 130 while the data storage device 103 is operatively coupled to the access device 130. The controller 102 is further configured to send data and commands to the memory 104 and to receive data from the memory 104. For example, the controller 102 is configured to send data and a write command to instruct the memory 104 to store the data to a specified address. As another example, the controller 102 is configured to send a read command to read data from a specified address of the memory 104.

The memory 104 may be partitioned into the first partition 106 and the second partition 108. The first partition 106 may be configured to store data received from the access device 130, such as the data 112. For example, the data 132, the data 152, the data 162, and the data 172 from the access device 130 may be transferred to the data storage device 103 to be stored in the first partition 106 as data 113, data 115, data 117, and data 119, respectively.

The first partition 106 may additionally include a control area 109 that stores a file system. For example, the file system may include a File Allocation Table (FAT) file system, such as an exFAT or FAT32 file system. In these examples, the control area 109 may include a cluster map and a directory structure. The directory structure may map directory entries to a cluster number (corresponding to a logical block address (LBA) range) of the cluster map. The control area 109 may further include a logical-to-physical translation (LPT) table that maps LBA to physical block addresses of the memory 104 at which the data 112 is stored.

The second partition 108 may be configured to store one or more links 122 to particular data of the data 112 stored in the first partition 106, as described in more detail below. The one or more links 122 may include or may correspond to symbolic links or junctions to particular data stored in the first partition 106. The second partition 108 may be configured as a read-only partition. For example, the second partition 108 may be accessible to the access device 130 only as a read-only partition.

Alternatively or additionally, the one or more links 122 may correspond to or may include one or more directory entries (e.g., cluster numbers) in a directory (e.g., an "additional directory" or a "sub-directory") associated with a file system. In these examples, the second partition 108 may additionally include a control area 111 that stores a file system.

For example, the file system stored in the control area 111 may include a File Allocation Table (FAT) file system, such as an exFAT or a FAT32 file system. In these examples, the control area 111 may include a cluster map and a directory structure. The cluster map of the control area 111 may include the same cluster map as the cluster map of the control area 109 of the first partition 106. The directory structure of the control area 111 may include a first directory structure that maps directory entries to a cluster number (corresponding to an LBA range) of the cluster map. The first directory structure may include entries for all of the data stored in the first partition 106 and may be the same (e.g., may include the same mappings) as the directory structure of the control area 109 of the first partition 106. The directory structure of the control area 111 may additionally include a second directory structure (e.g., a sub-directory or an additional directory) that maps entries in the second directory structure to a cluster number of the cluster map. The second directory structure may only include entries corresponding to particular data of the data 112 in the first partition 106 that matches a particular criterion, as described in more detail below.

The second directory structure may be generated by the controller 102 to enable the access device 130 to view stored files grouped according to a file type or other characteristic. For example, each entry in the second directory structure may be associated with (e.g., include a cluster number that identifies a memory address of) an image stored in the first partition 106 that was taken during a particular year or with a particular camera, as described in more detail below.

The controller 102 is configured to generate the one or more links 122 based on extracting metadata from data that is received from the access device 130. Data (e.g., a write payload) received from the access device 130 may include media data and a tag. For example, the data 132 may include media data 137 and a tag 134, the data 152 may include media data 157 and a tag 154, the data 162 may include media data 167 and a tag 164, and the data 172 may include media data 177 and a tag 174. The data 132, the data 152, the data 162, and the data 172 may each be included in respective write packets that are received at the data storage device 103 from the access device 130. An example of a write packet is described in further detail with reference to FIG. 3.

The media data 137, 157, 167, and 177 may include data such as image, video, or sound data or files. For example, the media data 137 may include a first image, the media data 157 may include a second image, the media data 167 may include a third image, and the media data 177 may include a fourth image.

Each of the tags 134, 154, 164, and 174 may include metadata and tag information. For example, the tag 134 may include metadata 136 and tag information 138. The tag 154 may include metadata 156 and tag information 158. The tag 164 may include metadata 166 and tag information 168. The tag 174 may include metadata 176 and tag information 178.

The metadata may include information about associated media data. For example, the metadata 136 may include information about the media data 137 of the data 132. The metadata 156 may include information about the media data 157 of the data 152. The metadata 166 may include information about the media data 167 of the data 162. The metadata 176 may include information about the media data 177 of the data 172.

The tag information may include information about associated metadata. For example, the tag information 138 may include information about the metadata 136, the tag information 158 may include information about the metadata 156, the tag information 168 may include information about the metadata 166, and the tag information 178 may include information about the metadata 176.

To illustrate, the tags 134, 154, 164, and 174 may include or may correspond to application marker segments (e.g., APP1 or APP2) or exchangeable image file format (EXIF) tags. For example, the tags 134, 154, 164, and 174 may include EXIF tags and the tag information 138, the tag information 158, the tag information 168, and the tag information 178 may include one or more EXIF tag identifiers (IDs). As an example, one or more EXIF tag IDs may indicate that associated metadata includes date/time information indicative of when an image in associated media data was taken. For example, one or more EXIF tag IDs of the tag information 138 may indicate that the metadata 136 includes date/time information indicative of when the first image was taken. As another example, one or more EXIF tag IDs of the tag information 158 may indicate that the metadata 156 includes date/time information indicative of when the second image was taken. As another example, one or more EXIF tag IDs of the tag information 168 may indicate that the metadata 166 includes date/time information indicative of when the third image was taken. As another example, one or more EXIF tag IDs of the tag information 178 may indicate that the metadata 176 includes date/time information indicative of when the fourth image was taken.

As another example, the one or more EXIF tag IDs may indicate that associated metadata includes a camera ID of a camera that took an image in associated media data. For example, one or more EXIF tag IDs of the tag information 138 may indicate that the metadata 136 includes a camera ID of a camera that took the first image.

Although the tags 134, 154, 164, and 174 are described in some examples as including EXIF or APP1 tags, other types of tags, such as ID3 tags (for audio files), may be used. Additionally, although the metadata is described in some examples as including date/time information or camera ID information, the metadata may include other information. For example, the metadata may include information (e.g., title, artist, year, or genre) associated with an audio file.

The controller 102 includes a pattern detector 124 configured to analyze data from the access device 130 to detect a tag. For example, the pattern detector 124 may be configured to analyze the data 132 to detect the tag 134. In some examples, the pattern detector 124 may be operative to detect the tags 134, 154, 164, and 174 by detecting patterns of bytes in the data 132, the data 152, the data 162, and the data 172, respectively. For example, the pattern detector 124 may be operative to detect one or more patterns (corresponding to particular tags) in a particular number of bytes (e.g., four bytes or more) of the data 132, the data 152, the data 162, and the data 172 at a particular location (e.g., at the beginning) of the data 132, the data 152, the data 162, and the data 172. Thus, the controller 102 (e.g., the pattern detector 124) may be configured to detect data that includes one or more particular tags.

The controller 102 may include a metadata extractor 149 to decode and extract metadata. When the controller 102 (e.g., the pattern detector 124) detects a tag in data that is received from the access device 130, the controller 102 (e.g., the metadata extractor 149) may be configured to decode one or more portions of associated data (e.g., associated metadata). In some examples, the one or more portions of the metadata are decoded for particular criteria (e.g., pre-configured criteria or criteria defined by a user) such that particular types or categories of metadata are extracted.

For example, the metadata may include EXIF metadata and the metadata extractor 349 may be configured to decode one or more portions of the EXIF metadata to extract particular categories of EXIF metadata, such as date/time metadata and/or a camera ID metadata. In this example, the data 132 may include an EXIF tag and the controller 102 may decode the metadata 136 to extract a date/time the first image was taken and/or a camera ID of the camera that took the first image. To illustrate, the controller 102 may decode the metadata 136 and determine that the first image was taken on Jan. 5, 2008 using a first camera. As a second example, the data 152 may include an EXIF tag and the controller 102 may decode the metadata 156 to extract a date/time the second image was taken and/or a camera ID of the camera that took the second image. To illustrate, the controller 102 may decode the metadata 156 and determine that the second image was taken on Jan. 5, 2009 using a second camera. As a third example, the data 162 may include an EXIF tag and the controller 102 may decode the metadata 166 to extract a date/time the third image was taken and/or a camera ID of the camera that took the third image. To illustrate, the controller 102 may decode the metadata 166 and determine that the third image was taken on Jan. 20, 2008 using the second camera. As a fourth example, the data 172 may include an EXIF tag and the controller 102 may decode the metadata 176 to extract a date/time the fourth image was taken and/or a camera ID of the camera that took the fourth image. To illustrate, the controller 102 may decode the metadata 176 and determine that the fourth image was taken on Jan. 20, 2009 using the second camera.

Thus, the controller 102 may decode and extract metadata in data received form the access device 130 based on whether the controller 102 detects one or more particular tags. To illustrate, when the controller 102 does not detect a tag in data from the access device 130, the controller 102 may not decode the metadata. For example, the pattern detector 124 may be configured to detect patterns corresponding to EXIF tags. In this example, the data 132 may not include an EXIF tag and the controller 102 may thus not decode the metadata 136.

The data storage device 103 may include a metadata database 142 to store extracted metadata (e.g., the metadata 136, 156, 166, and 176). The metadata database 142 may be stored in the memory 104. The controller 102 may be configured to populate the metadata database 142 with the extracted metadata 136, 156, 166, and 176.

The controller 102 may include a link generator 146. The controller 102 may be configured to access the metadata database 142 during an update period to retrieve metadata about the data 112 stored in the first partition 106 in order for the link generator 146 to generate, update, and/or organize the one or more links 122 to the data 112 in the first partition 106. For example, the controller 102 may be configured to retrieve the metadata 136, 156, 166, and 176 from the metadata database 142 and the link generator 146 may be configured to analyze the metadata 136, 156, 166, and 176 to generate, update, and/or organize the one or more links 122 to the data 112 in the first partition 106.

In some examples, the controller 102 (e.g., the link generator 146) may be configured to retrieve the metadata and to generate the one or more links 122 when the data storage device 103 is inaccessible to the access device 130. For example, the link generator 146 may be configured to generate the one or more links 122 only when the data storage device 103 is unmounted (e.g., during a power on event, in response to a request for synchronization, or during a low-power mode (e.g., sleep mode) of access device 130, etc.).

In some examples, the controller 102 (e.g., the link generator 146) may be configured to analyze the metadata with respect to one or more criteria 148 to generate, update, and/or organize the one or more links 122. The one or more criteria 148 may be determined by a user of the data storage device 103. In other examples, the one or more criteria 148 may be pre-determined by a manufacturer of the data storage device 103. The data storage device 103 may be configured to store the one or more criteria 148. Each criterion of the one or more criteria 148 may be associated with or may correspond to a particular characteristic of data. The controller 102 (e.g., the link generator 146) may be configured to determine whether data stored in the first partition 106 satisfies the one or more criteria 148 based on extracted metadata. When data stored in the first partition 106 satisfies a criterion of the one or more criteria 148, a directory and/or a link (e.g., a symbolic link, a junction, and/or a directory entry of a file system) may be generated or updated in the second partition 108 that points to the data (stored in the first partition 106) that satisfies the particular criterion, as described in further detail with reference to FIG. 2.

Thus, the controller 102 (e.g., the link generator 146) may be configured to generate one or more links in the second partition 108 to particular data in the first partition 106 based on metadata indicating that the particular data satisfies one or more criteria. As explained further with reference to FIG. 2, the controller 102 (e.g., the link generator 146) may be configured to organize, e.g., group, the one or more links into virtual directories based on metadata. Each virtual directory may be associated with a particular criterion of the one or more criteria and each link grouped in a virtual directory may point to data in the first partition that shares the particular criterion. Thus, the controller 102 (e.g., the link generator 146) may be configured to automatically generate and organize one or more links to particular data stored in the memory 104 based on extracted metadata. Automatically generating and updating the links may enable a user to forego manually grouping the data into directories or libraries. Additionally, because the data is organized locally in the data storage device 103, the user may organize the data without sending the data to an online service or a host-based service, thereby avoiding potentially exposing sensitive data.

Figure 2:
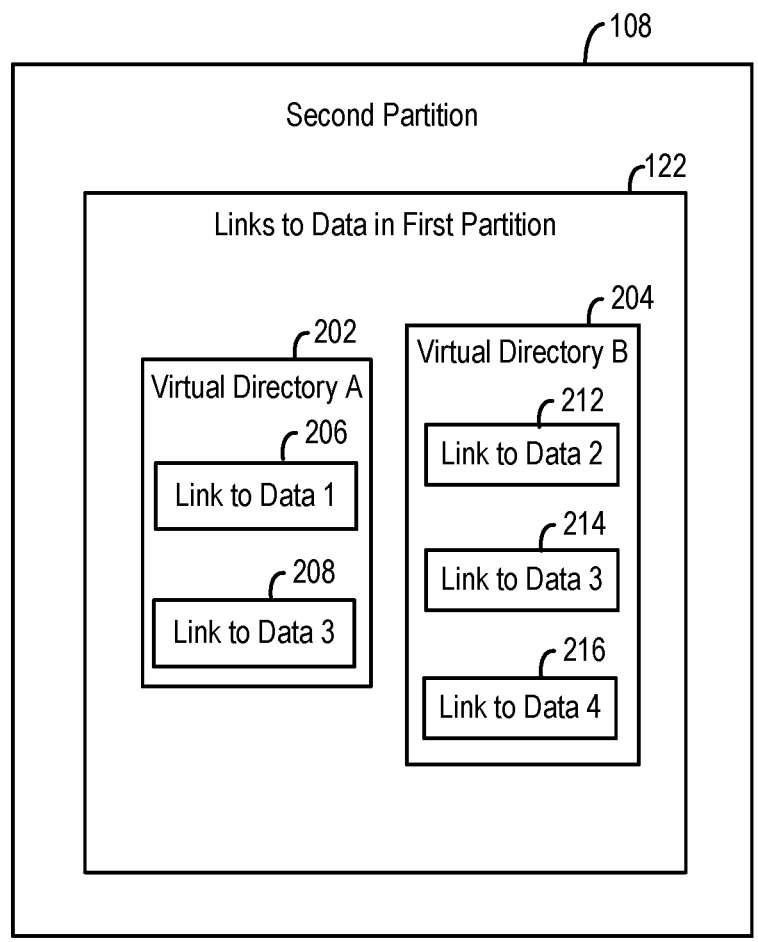
FIG. 2 is a diagram of a particular illustrative example of a second partition in a memory of the data storage device of FIG. 1.

FIG. 2 depicts an example implementation of the second partition 108 of FIG. 1. The second partition 108 of FIG. 2 may include a first virtual directory 202 associated with a first particular criterion of the one or more criteria 148. As an example, the first particular criterion may correspond to a particular year in which an image is taken. For example, the particular year may correspond to the year in which the second and fourth images were taken (e.g., may correspond to the year 2008). In this example, one or more links to particular data stored in the first partition 106 may be generated or updated in response to the controller 102 (e.g., the link generator 146) determining that extracted metadata indicates an image taken in the year 2008. For example, the first virtual directory 202, and a link 206 to the data 113, may be generated in response to the controller 102 detecting, based on the metadata 136 (e.g., retrieved from the metadata database 142), that the data 113 includes an image taken in the year 2008. Alternatively or additionally, the first virtual directory 202 may already be generated and the controller 102 may update the first virtual directory 202 with a link 208 to the data 117 based on the metadata 166 (e.g., retrieved from the metadata database 142) indicating that the data 117 includes an image taken in the year 2008. In this example, because the metadata 156 and the metadata 176 indicates that the second and fourth images were not taken in the year 2008, the controller 102 may not update the first virtual directory 202 with links to the data 115 or to the data 119. Thus, in this example, the links 206 and 208 are organized, e.g., grouped, into the first virtual directory 202 based on the metadata 136 and 166 indicating that the data 113 and 117 satisfies a criterion of the one or more criteria 148.

The second partition 108 of FIG. 2 may additionally or alternatively include a second virtual directory 204 associated with a second particular criterion of the one or more criteria 148. As an example, the second particular criterion may correspond to a particular camera ID of a camera used to take an image. For example, the particular camera ID may correspond to a camera ID of the second camera used to take the second, third, and fourth images as described in the example above. In this example, one or more links to particular data stored in the first partition 106 may be generated or updated in response to the controller 102 (e.g., the link generator 146) determining that extracted metadata associated with the particular data indicates that the particular data includes an image taken by the second camera. For example, the second virtual directory 204, and a link 212 to the data 115, may be generated in response to the controller 102 detecting, based on the metadata 156, that the data 115 includes an image taken by the second camera. Alternatively or additionally, the second virtual directory 204 may already be generated and the controller 102 may update the second virtual directory 204 with a link 214 to the data 117 based on the metadata 166 indicating that the data 117 includes an image taken by the second camera. As another example, the second virtual directory 204 may already be generated and the controller 102 may update the second virtual directory 204 with a link 216 to the data 119 based on the metadata 176 indicating that the data 119 includes an image taken by the second camera. In this example, because the metadata 136 does not indicate that the data 113 includes an image taken using the second camera, the controller 102 may not update the second virtual directory 204 with links to the data 113. Thus, in this example, the links 212, 214, and 216 are organized, e.g., grouped, into the second virtual directory 204 based on the metadata 156, 166, and 176 indicating that the data 115, 117, and 119 satisfies a criterion of the one or more criteria 148.

Although the above examples describe the particular criteria as including a year an image was taken or a camera ID of a camera that took an image, other criteria may be used. For example, the data 112 may include one or more audio files and the particular criteria may include a title, an artist, a year, or a genre of audio files.

Figure 3:
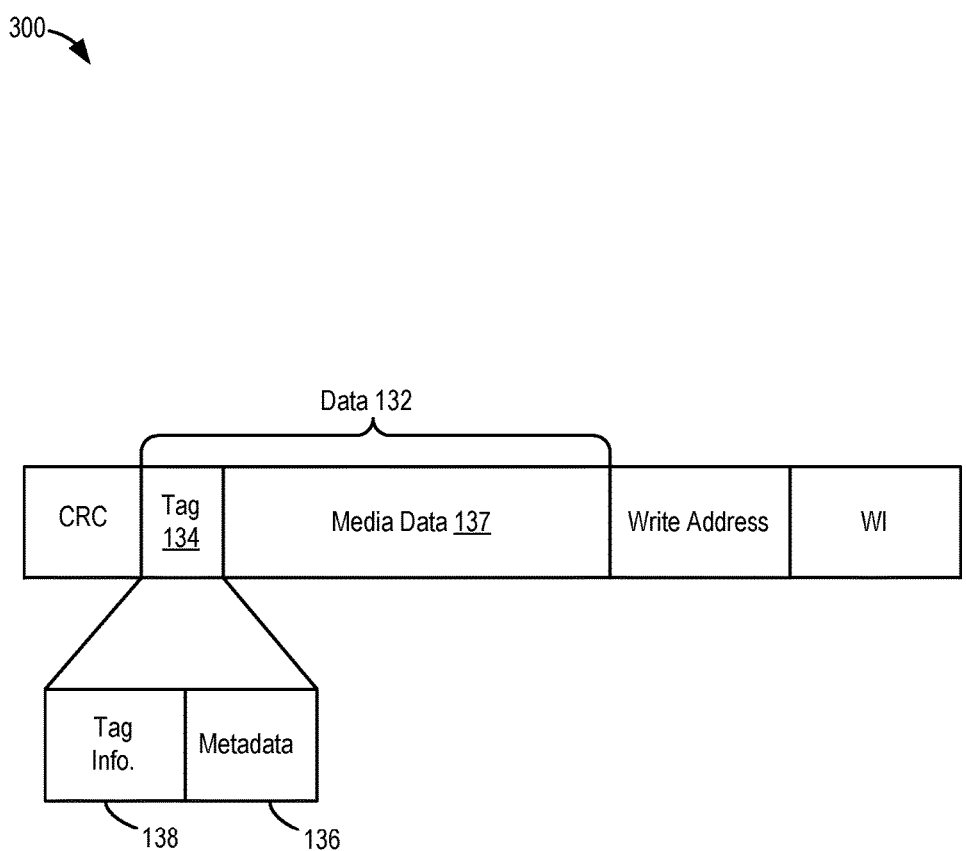
FIG. 3 is a diagram of a particular illustrative example of a write packet.

FIG. 3 illustrates a particular example of a write packet 300 in which the data 132 of FIG. 1 may be included. The write packet 300 of FIG. 3 may include a cyclic redundancy check (CRC) field, the tag 134, the media data 137, a write address, and a write instruction (WI). The tag 134 includes the tag information 138 and the metadata 136. The format of the write packet 300 enables the controller 102 to locate the tag 134 for analysis by the pattern detector 124.

Figure 4:
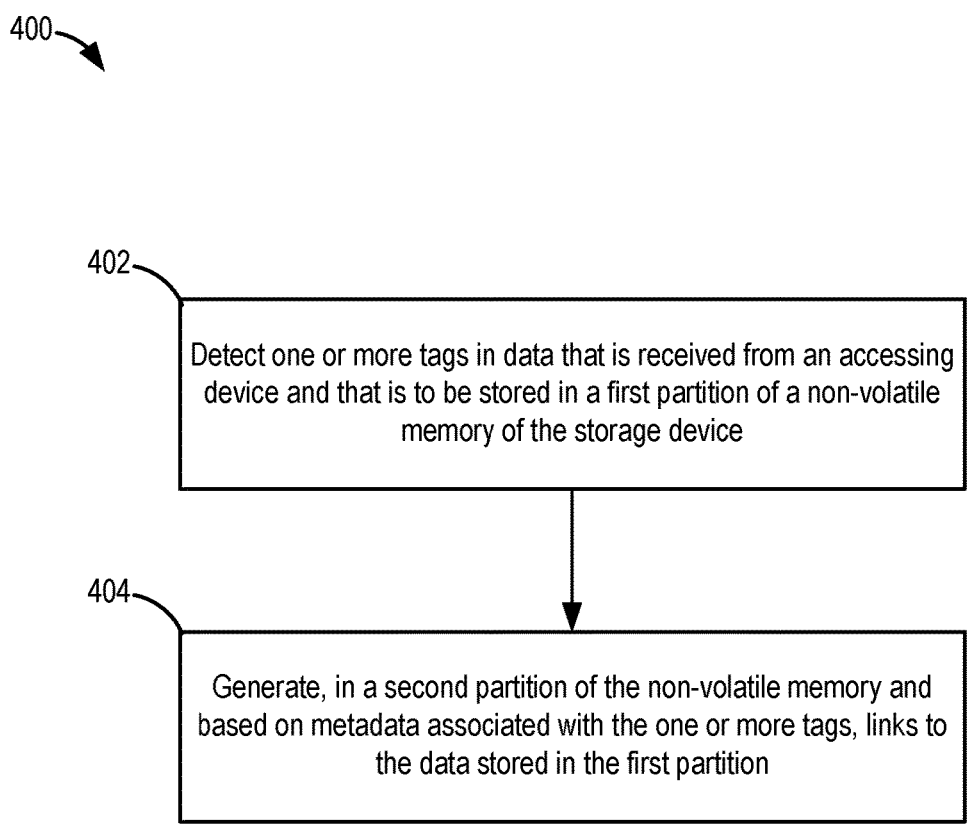
FIG. 4 is a flow chart of a particular illustrative embodiment of a method of generating, in a second partition of a memory and based on metadata, one or more links to data stored in a first partition of the memory.

Referring to FIG. 4, a particular illustrative example of a method is depicted and generally designated 400. The method 400 may be performed at a data storage device, such as at the data storage device 103 of FIG. 1.

The method 400 includes detecting one or more tags in data that is received from an access device and that is to be stored in a first partition of a non-volatile memory of the data storage device, at 402. For example, the access device may correspond to the access device 130 and the data that is received from the access device 130 may include or may correspond to the data 132, 152, 162, and/or 172 that is to be stored in the first partition 106 of the memory 104. In some examples, the data 132, 152, 162, and/or 172 may include image data.

The one or more tags may include or may correspond to one or more of the tags 134, 154, 164, and 174. In some examples, the one or more tags may include one or more EXIF tags. In some examples, the one or more tags may be detected using the pattern detector 124 of FIG. 1 as described above. For example, the controller 102 of FIG. 1 may compare one or more bits of the data 132, 152, 162, and/or 172 to a bit pattern corresponding to one or more tags to detect one or more of the tags 134, 154, 164, and 174.

The method 400 further includes generating, in a second partition of the non-volatile memory and based on metadata associated with the one or more tags, links to the data stored in the first partition, at 404. The second partition may correspond to the second partition 108 of FIG. 1 and the links may correspond to or may include the one or more links 122 of FIG. 1. In some examples, the links are generated when the data storage device 103 is inaccessible to the access device 130 (e.g., when the data storage device 103 is unmounted) as described above. The metadata may correspond to the metadata 136, 156, 166, and 176. In some examples, the metadata includes EXIF data.

The one or more links 122 may be generated by analyzing the metadata 136, 156, 166, and 176 with respect to criteria (e.g., the one or more criteria 148 of FIG. 1) to determine whether data associated with the metadata 136, 156, 166, and/or 176 satisfies a particular criterion. For example, the controller 102 may analyze the metadata 136, 156, 166, and 176 to identify which associated data includes data having the particular criterion. For example, as described above, the particular criterion may correspond to a particular year in which an image was taken, and the controller may analyze the metadata 136, 156, 166, and 176 to determine that the data 113 and the data 117 correspond to images that were taken in the particular year. Based on determining that the data 113 and 117 was taken in the particular year, the controller 102 may generate the links 206 and 208 (in the first virtual directory 202 associated with images taken in the particular year) to the data 113 and 117, respectively. As another example, as described above, the particular criterion may correspond to a particular camera that took the image, and the controller may analyze the metadata 136, 156, 166, and 176 to determine that the data 115, 117, and 119 correspond to images that were taken using the particular camera. Based on determining that the data 115, 117, and 119 were taken using the particular camera, the controller 102 may generate the links 212, 214, and 216 (in the second virtual directory 204 associated with images taken using the particular camera) to the data 115, 117, and 119 respectively.

In some examples, the method 400 further includes populating a metadata database with the metadata. For example, the metadata database may correspond to the metadata database 142 of FIG. 1. In this example, the controller 102 of FIG. 1 may retrieve the metadata 136, 156, 166, and 176 from the metadata database 142 during an update period and analyze the metadata 136, 156, 166, and 176 with respect to the criteria 148 as described above.

Thus, links in the second partition 108 to data in the first partition 106 may be generated based on metadata indicating that the data satisfies a particular criterion. The links may be organized, e.g., grouped, into virtual directories. Each virtual directory may be associated with a particular criterion and each link grouped in a virtual directory may point to data in the first partition that satisfies the particular criterion. Thus, links to particular data stored in the memory 104 may be automatically generated and organized (e.g., grouped into virtual directories) based on extracted metadata. Automatically generating and updating the links may enable a user to forego manually grouping the data into directories or libraries. Additionally, because the data is organized locally in the data storage device 103, the user may organize the data without sending the data to an online service or a host-based service, thereby avoiding potentially exposing sensitive data.

Figure 5A:
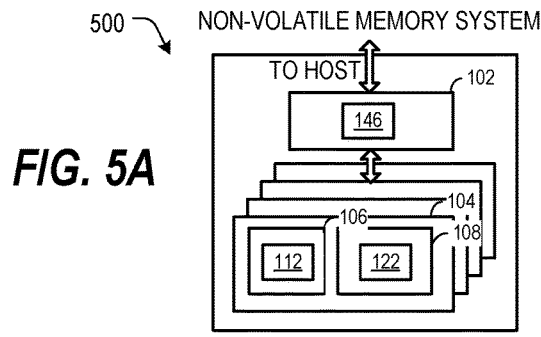
FIG. 5A is a block diagram of a particular illustrative embodiment of a non-volatile memory system.
Figure 5B:
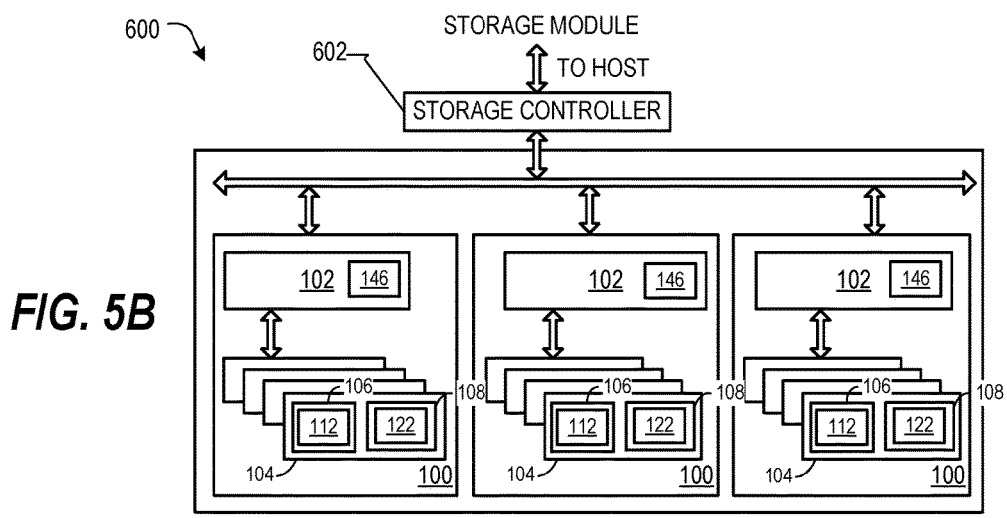
FIG. 5B is a block diagram of a particular illustrative embodiment of a storage module including a plurality of the non-volatile memory systems of FIG. 5A.
Figure 5C:
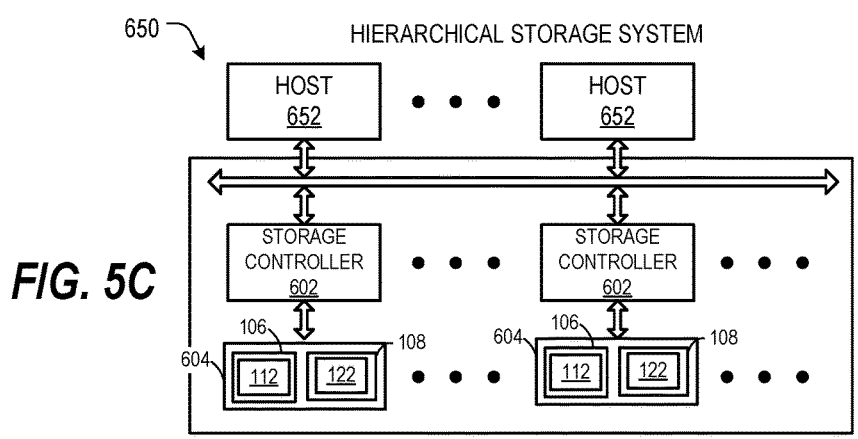
FIG. 5C is a block diagram of a particular illustrative embodiment of a hierarchical storage system.

Memory systems suitable for use in implementing aspects of the disclosure are shown in FIGS. 5A-5C. FIG. 5A is a block diagram illustrating a non-volatile memory system according to an example of the subject matter described herein. Referring to FIG. 5A, a non-volatile memory system 500 includes the controller 102 and non-volatile memory that may be made up of one or more non-volatile memory die 104. As used herein, the term "memory die" refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104. The controller 102 may include the link generator 146 of FIG. 1.

The controller 102 (which may be a flash memory controller) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can be stored external to the controller, and other components can be used. Additionally, the phrase "operatively in communication with" could mean directly in communication with or indirectly (wired or wireless) in communication with through one or more components, which may or may not be shown or described herein.

As used herein, a flash memory controller is a device that manages data stored on flash memory and communicates with a host, such as a computer or electronic device. A flash memory controller can have various functionality in addition to the specific functionality described herein. For example, the flash memory controller can format the flash memory, map out bad flash memory cells, and allocate spare cells to be substituted for future failed cells. Some part of the spare cells can be used to hold firmware to operate the flash memory controller and implement other features. In operation, when a host is to read data from or write data to the flash memory, the host communicates with the flash memory controller. If the host provides a logical address to which data is to be read/written, the flash memory controller can convert the logical address received from the host to a physical address in the flash memory. (Alternatively, the host can provide the physical address.) The flash memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The non-volatile memory die 104 may be configured to include the first partition 106 and the second partition 108 of FIG. 1. The second partition 108 may be configured to store the one or more links 122 to particular data of the data 112 stored in the first partition 106.

The interface between the controller 102 and the non-volatile memory die 104 may be any suitable flash interface, such as Toggle Mode 200, 400, or 800. In one embodiment, the non-volatile memory system 100 may be a USB flash drive or a card based system, such as a secure digital (SD) or a micro secure digital (micro-SD) card. In an alternate embodiment, memory system 100 may be part of an embedded memory system.

Although, in the example illustrated in FIG. 1A, the non-volatile memory system 100 (sometimes referred to herein as a storage module) includes a single channel between the controller 102 and the non-volatile memory die 104, the subject matter described herein is not limited to having a single memory channel. For example, in some NAND memory system architectures (such as the ones shown in FIGS. 5B and 5C), 2, 4, 8 or more NAND channels may exist between the controller and the NAND memory device, depending on controller capabilities. In any of the embodiments described herein, more than a single channel may exist between the controller 102 and the non-volatile memory die 104, even if a single channel is shown in the drawings.

FIG. 5B illustrates a storage module 600 that includes plural non-volatile memory systems 500. As such, storage module 600 may include a storage controller 602 that interfaces with a host and with storage system 604, which includes a plurality of non-volatile memory systems 500. The interface between the storage controller 602 and non-volatile memory systems 500 may be a bus interface, such as a serial advanced technology attachment (SATA) or peripheral component interface express (PCIe) interface. Storage module 600, in one embodiment, may be a solid state drive (SSD), such as found in portable computing devices, such as laptop computers, and tablet computers. Each controller 102 of FIG. 5B may include a link generator corresponding to the link generator 146. Alternatively or in addition, the storage controller 602 may include a link generator corresponding to the link generator 146. Alternatively or additionally, each non-volatile memory die 104 of FIG. 5B may be configured to include a first partition 106 and a second partition 108. The second partition 108 may be configured to store one or more links 122 to particular data of the data 112 stored in the first partition 106.

FIG. 5C is a block diagram illustrating a hierarchical storage system. A hierarchical storage system 650 includes a plurality of storage controllers 602, each of which controls a respective storage system 604. Host systems 652 may access memories within the hierarchical storage system 650 via a bus interface. In one embodiment, the bus interface may be an NVMe or fiber channel over Ethernet (FCoE) interface. In one embodiment, the hierarchical storage system 650 illustrated in FIG. 5C may be a rack mountable mass storage system that is accessible by multiple host computers, such as would be found in a data center or other location where mass storage is needed. Each storage controller 602 of FIG. 5C may include a link generator corresponding to the link generator 146. Alternatively or additionally, each storage system 604 of FIG. 5C may be configured to include a first partition 106 and a second partition 108. The second partition 108 may be configured to store one or more links 122 to particular data of the data 112 stored in the first partition 106.

Figure 6A:
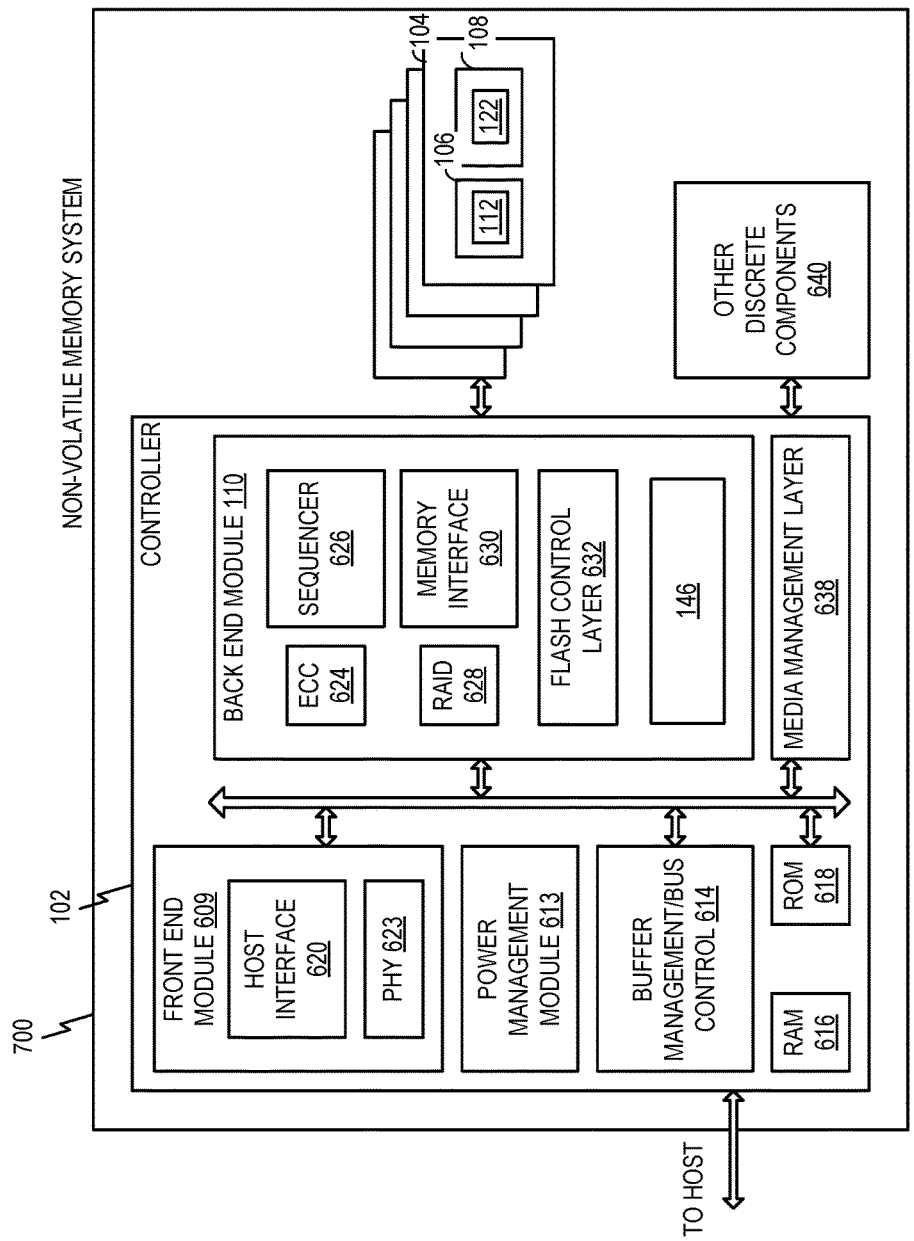
FIG. 6A is a block diagram of components of a particular illustrative embodiment of a controller.

FIG. 6A is a block diagram illustrating exemplary components of controller 102 in more detail. Controller 102 includes a front end module 609 that interfaces with a host, a back end module 610 that interfaces with the one or more non-volatile memory die 104, and various other modules that perform other functions. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example.

Referring again to modules of the controller 102, a buffer manager/bus controller 614 manages buffers in random access memory (RAM) 616 and controls the internal bus arbitration of the controller 102. A read only memory (ROM) 618 stores system boot code. Although illustrated in FIG. 6A as located within the controller 102, in other embodiments one or both of the RAM 616 and the ROM 618 may be located externally to the controller 102. In yet other embodiments, portions of RAM and ROM may be located both within the controller 102 and outside the controller 102.

Front end module 609 includes a host interface 620 and a physical layer interface (PHY) 622 that provide the electrical interface with the host or next level storage controller. The choice of the type of host interface 620 can depend on the type of memory being used. Examples of host interfaces 620 include, but are not limited to, SATA, SATA Express, SAS, Fibre Channel, USB, PCIe, and NVMe. The host interface 620 typically facilitates transfer for data, control signals, and timing signals.

Back end module 610 includes an error correction code (ECC) engine 624 that encodes the data received from the host, and decodes and error corrects the data read from the non-volatile memory. A command sequencer 626 generates command sequences, such as program and erase command sequences, to be transmitted to non-volatile memory die 104. A RAID (Redundant Array of Independent Drives) module 628 manages generation of RAID parity and recovery of failed data. The RAID parity may be used as an additional level of integrity protection for the data being written into the non-volatile memory die 104. In some cases, the RAID module 628 may be a part of the ECC engine 624. A memory interface 630 provides the command sequences to non-volatile memory die 104 and receives status information from non-volatile memory die 104. For example, the memory interface 630 may be a double data rate (DDR) interface, such as a Toggle Mode 200, 400, or 800 interface. A flash control layer 632 controls the overall operation of back end module 610. The back end module 610 may also include the link generator 146.

The non-volatile memory die 104 of FIG. 6A may be configured to include a first partition 106 and a second partition 108. The second partition 108 may be configured to store links 122 to particular data of the data 112 stored in the first partition 106.

Additional components of system 700 illustrated in FIG. 6A include a power management module 613 and a media management layer 638, which performs wear leveling of memory cells of non-volatile memory die 104. System 700 also includes other discrete components 640, such as external electrical interfaces, external RAM, resistors, capacitors, or other components that may interface with controller 102. In alternative embodiments, one or more of the physical layer interface 623, RAID module 628, media management layer 638 and buffer management/bus controller 614 are optional components that are omitted from the controller 102.

Figure 6B:
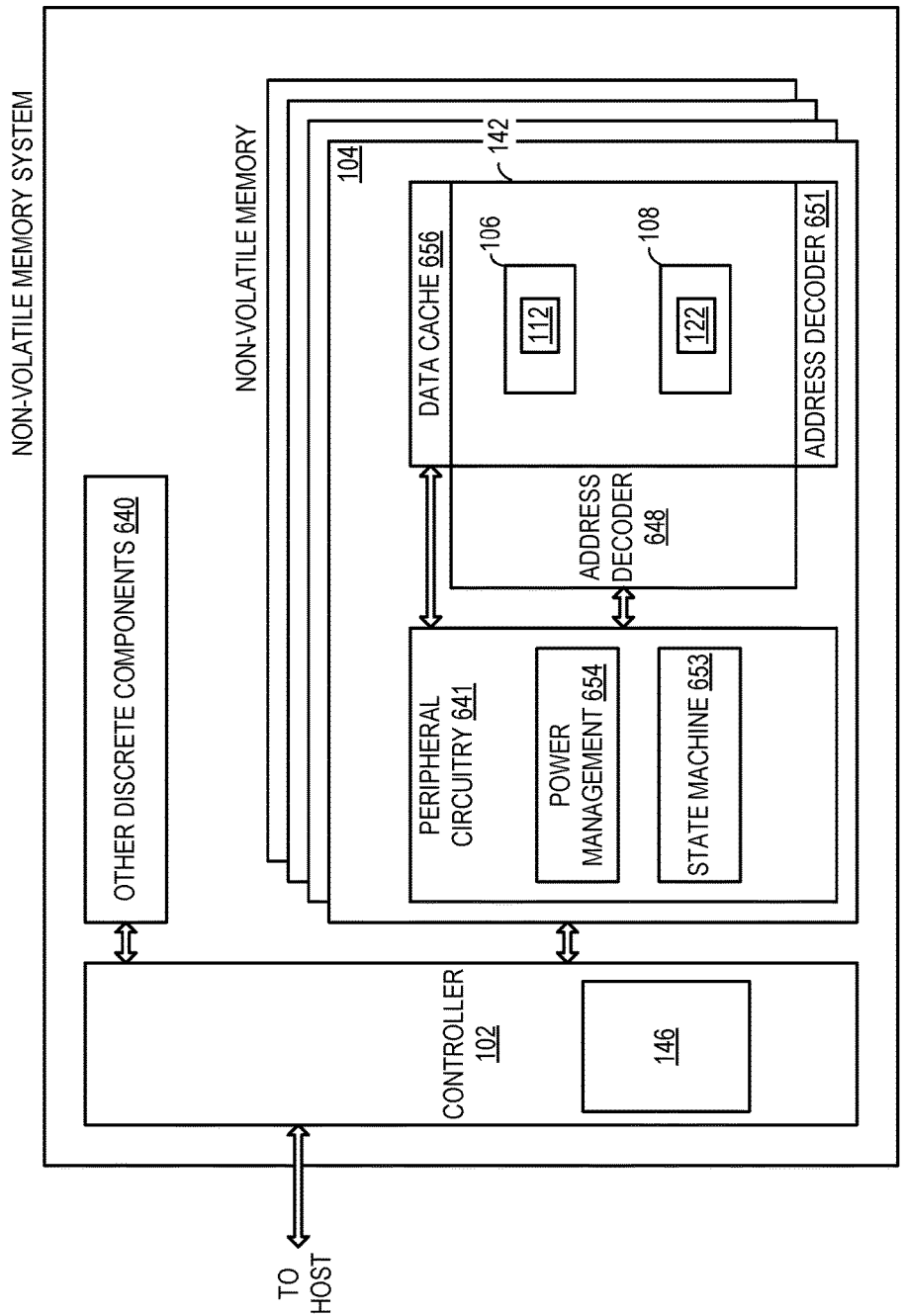
FIG. 6B is a block diagram of components of a particular illustrative embodiment of a non-volatile memory die.

FIG. 6B is a block diagram illustrating exemplary components of non-volatile memory die 104 in more detail. Non-volatile memory die 104 includes peripheral circuitry 641 and non-volatile memory array 642. Non-volatile memory array 642 includes the non-volatile memory cells used to store data and non-volatile memory cells used to store the one or more links 122. The non-volatile memory array 642 may be configured to include a first partition 106 and a second partition 108. The second partition 108 may be configured to store one or more links 122 to particular data of the data 112 stored in the first partition 106. The non-volatile memory cells may be any suitable non-volatile memory cells, including NAND flash memory cells and/or NOR flash memory cells in a two dimensional and/or three dimensional configuration. Peripheral circuitry 641 includes a state machine 653 that provides status information to controller 102, which may include the link generator 146. The peripheral circuitry 641 may also include a power management or data latch control module 654. Non-volatile memory die 104 further includes discrete components 640, an address decoder 648, an address decoder 651, and a data cache 656 that caches data.

Although various components depicted herein are illustrated as block components and described in general terms, such components may include one or more microprocessors, state machines, or other circuits configured to enable the link generator 146 of FIGS. 1, 5A, 5B, 5C, 6A, and 6B to generate the one or more links 122 to particular data of the data 112 in the first partition 106. For example, the link generator 146 may represent physical components, such as hardware controllers, state machines, logic circuits, or other structures, to enable the link generator 146 to generate the one or more links 122 to particular data of the data 112 in the first partition 106.

The link generator 146 may be implemented using a microprocessor or microcontroller programmed to analyze metadata extracted from data to be stored in a first partition of memory (e.g., the first partition 106) with respect to one or more criteria (e.g., the one or more criteria 148) to generate the one or more links 122. In a particular embodiment, the link generator 146 includes a processor executing instructions that are stored at the memory 104. Alternatively, or in addition, executable instructions that are executed by the processor may be stored at a separate memory location that is not part of the memory 104, such as at a read-only memory (ROM).

In a particular embodiment, the data storage device 103 may be implemented in a portable device configured to be selectively coupled to one or more external devices. However, in other embodiments, the data storage device 103 may be attached or embedded within one or more host devices, such as within a housing of a host communication device. For example, the data storage device 103 may be within a packaged apparatus such as a wireless telephone, a personal digital assistant (PDA), a gaming device or console, a portable navigation device, or other device that uses internal non-volatile memory. In a particular embodiment, the data storage device 302 may include a non-volatile memory, such as a three-dimensional (3D) memory, a flash memory (e.g., NAND, NOR, Multi-Level Cell (MLC), a Divided bit-line NOR (DINOR) memory, an AND memory, a high capacitive coupling ratio (HiCR), asymmetrical contactless transistor (ACT), or other flash memories), an erasable programmable read-only memory (EPROM), an electrically-erasable programmable read-only memory (EEPROM), a read-only memory (ROM), a one-time programmable memory (OTP), or any other type of memory.

The illustrations of the embodiments described herein are intended to provide a general understanding of the various embodiments. Other embodiments may be utilized and derived from the disclosure, such that structural and logical substitutions and changes may be made without departing from the scope of the disclosure. This disclosure is intended to cover any and all subsequent adaptations or variations of various embodiments.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present invention is to be determined by the broadest permissible interpretation of the following claims and their equivalents, and shall not be restricted or limited by the foregoing detailed description.

What is claimed is:

1. A data storage device comprising:
    a non-volatile memory including a first partition and a second partition, the first partition including a first file system and the second partition including a second file system; and
    a controller within the storage device comprising both a separate hardware metadata extractor and a hardware link generator, the controller further comprising a processor, wherein the controller comprises a hardware pattern detector that is configured to detect one or more tags in data from an access device to be stored as one or more directory entries in the first file system in the first partition, the controller configured to automatically generate, in the second partition, one or more links, through the hardware link generator, corresponding to one or more virtual directory entries in the second file system that points to the one or more directory entries in the first file system comprising the data that is stored in the first partition, the one or more links organized according to extracting metadata associated with the one or more tags as extracted by the metadata extractor.

2. The data storage device of claim 1, wherein the controller is configured to populate a metadata database with the metadata.

3. The data storage device of claim 2, wherein the non-volatile memory includes the metadata database.

4. The data storage device of claim 1, wherein the second partition is accessible to the access device as a read-only partition.

5. The data storage device of claim 1, wherein the one or more tags include exchangeable image file format (EXIF) tags.

6. The data storage device of claim 1, wherein the data includes image data.

7. A method performed in a data storage device, the method comprising:
    detecting, through use of a controller in the data storage device one or more tags in data that is received from an access device and that is to be stored in a first partition of a non-volatile memory of the storage device, the first partition including a first file system, the data that is to be stored in the first partition including one or more directory entries in the first file system; and
    generating, through use of a controller within the data storage device with a processor comprising both a separate hardware link generator and hardware metadata extractor, in a second partition including a second file system of the non-volatile memory and based on metadata associated with the one or more tags as determined by the hardware metadata extractor, links corresponding to one or more virtual directory entries in the second file system that points to the one or more directory entries in the first file system comprising the data stored in the first partition, wherein the generating is performed automatically as determined by the hardware link generator.

8. The method of claim 7, wherein the links are generated when the data storage device is unmounted.

9. The method of claim 7, further comprising populating a metadata database with the metadata.

10. The method of claim 7, wherein the data includes image data.

11. The method of claim 10, wherein the one or more tags include one or more exchangeable image file format (EXIF) tags.

12. The method of claim 11, wherein the metadata includes EXIF data.

13. The method of claim 7, wherein the links are generated when the data storage device is inaccessible to the access device.

14. A data storage device, comprising:
a non-volatile memory including:
   a first partition including a first file system to store data received from an access device, the data that is to be stored in the first partition including one or more directory entries in the first file system, and
   a second partition including a second file system to store one or more directories of links, as determined by a hardware link generator, corresponding to one or more virtual directory entries in the second file system that points to the one or more directory entries in the first file system comprising the data stored in the first partition; and
a controller within the device, the controller comprising a processor comprising the hardware link generator, a hardware metadata extractor and a hardware pattern detector to detect one or more tags from the data, configured to automatically generate or update the one or more directory entries in the first file system based on metadata, as extracted by the metadata extractor, associated with the one or more tags from the data.

15. The data storage device of claim 14, wherein the metadata includes exchangeable image file format (EXIF) data.

16. The data storage device of claim 14, wherein the data includes image data.

17. The data storage device of claim 14, wherein the controller is configured to compare one or more bits of the data to a bit pattern corresponding to one or more tags.

18. The data storage device of claim 14, wherein the second partition is accessible to the access device as a read-only partition.

19. The data storage device of claim 14, wherein the controller is configured to populate a metadata database with the metadata.

* * * * *